US012669288B2

(12) United States Patent
Eiselt et al.

(10) Patent No.: US 12,669,288 B2
(45) Date of Patent: Jun. 30, 2026

(54) ELECTRICALLY DECOUPLED HIGH-TEMPERATURE THERMAL INSULATION

(71) Applicant: SGL CARBON SE, Wiesbaden (DE)

(72) Inventors: Frank Eiselt, Meitingen (DE); Bojan Jokanovic, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 861 days.

(21) Appl. No.: 17/908,024

(22) PCT Filed: Feb. 17, 2021

(86) PCT No.: PCT/EP2021/053889
§ 371 (c)(1),
(2) Date: Aug. 30, 2022

(87) PCT Pub. No.: WO2021/175594
PCT Pub. Date: Sep. 10, 2021

(65) Prior Publication Data
US 2023/0083865 A1 Mar. 16, 2023

(30) Foreign Application Priority Data
Mar. 4, 2020 (DE) ..................... 10 2020 202 793.5

(51) Int. Cl.
*F27D 1/00* (2006.01)
*F27D 99/00* (2010.01)

(52) U.S. Cl.
CPC ....... *F27D 1/0009* (2013.01); *F27D 99/0006* (2013.01); *F27D 2099/0015* (2013.01)

(58) Field of Classification Search
CPC ............... F27D 1/0009; F27D 99/0006; F27D 2099/0015; F27D 1/0033; F27D 1/0023; F16L 59/022; F16L 59/029
See application file for complete search history.

(56) References Cited

U.S. PATENT DOCUMENTS

| | | | |
|---|---|---|---|
| 5,229,576 | A | 7/1993 | Nakao et al. |
| 2006/0083495 | A1 | 4/2006 | Taiquing |

(Continued)

FOREIGN PATENT DOCUMENTS

| | | | |
|---|---|---|---|
| CN | 102748951 | A | 10/2012 |
| CN | 202610393 | U | 12/2012 |

(Continued)

OTHER PUBLICATIONS

International Search Report (with English Translation) and Written Opinion (with Machine Translation) issued on May 11, 2021 in corresponding International Patent Application No. PCT/EP2021/053889; 19 pages.

(Continued)

*Primary Examiner* — Brian W Jennison
(74) *Attorney, Agent, or Firm* — Maier & Maier, PLLC

(57) ABSTRACT

An insulation element for the thermal insulation of an inductively heatable high-temperature treatment zone. A wall of the insulation element contains a flat material, the resistivity of which is ρF 10-5 to 10-1 Ωm and which encloses a hollow space extending through the insulation element and includes a discontinuity, in which the resistivity ρU is greater than ρF. The discontinuity extends from the external surface of the flat material into the flat material but does not interrupt the flat material over the entire cross section of the flat material.

13 Claims, 6 Drawing Sheets

(56) References Cited

U.S. PATENT DOCUMENTS

| | | | | |
|---|---|---|---|---|
| 2008/0196641 | A1* | 8/2008 | Johansson | F27D 1/0006 373/130 |
| 2015/0079317 | A1* | 3/2015 | Benitsch | B32B 1/08 428/34.1 |

FOREIGN PATENT DOCUMENTS

| | | | |
|---|---|---|---|
| DE | 2838588 | A1 | 3/1979 |
| DE | 2831151 | A1 | 1/1980 |
| DE | 68920856 | T2 | 8/1989 |
| DE | 102012208595 | A1 | 11/2013 |
| EP | 1834150 | A1 | 9/2007 |
| EP | 1852252 | A1 | 11/2007 |
| JP | 727488 | A | 1/1995 |
| WO | 2011106580 | A2 | 9/2011 |
| WO | 2013174898 | A1 | 11/2013 |

OTHER PUBLICATIONS

Office Action issued on Jan. 21, 2021, in connection with corresponding German Application No. 102020202793.5 (10 pp., including machine-generated English translation).

* cited by examiner

ELECTRICALLY DECOUPLED HIGH-TEMPERATURE THERMAL INSULATION

FIELD

The present invention relates to an insulation element for thermally insulating an inductively heatable high-temperature treatment zone, to a set of insulation element portions for forming an insulation element comprising the insulation element portions, to a method for producing a flat material that can be used to insulate an inductively heated high-temperature treatment zone and to the use of the insulation element for thermally insulating an inductively heated high-temperature treatment zone.

BACKGROUND

High-temperature processes that take place for example in an inert atmosphere at above 800° C. place high thermal and mechanical demands on the insulating materials used. Carbonised and optionally graphitized felts are often used as the material for insulating bodies that separate the heating chamber form the cooled outer wall of high-temperature furnaces.

EP 1 852 252 B1 discloses a method for producing high temperature-resistant insulating bodies, in which, a plurality of curved segments inter alia made from a material based on expanded graphite that is compressed to a density of between 0.02 and 0.3 g/cm$^3$ are assembled to form a hollow-cylindrical component. The individual segments are held together by a carbonisable binder in this case, which contains planar anisotropic graphite particles. Furthermore, a graphite foil is arranged on the inner surface of the hollow-cylindrical insulating body.

WO 2011/106580 A2 discloses an insulating body for a reactor made of a carbon fibre material, which is assembled from a plurality of individual plate-like components. The individual components can be coupled by "tongue and groove" plug-in connections using additional connecting elements.

Utility model document CN202610393U describes a heat preserving device for producing sapphire crystals, in which a circumferential graphite felt gasket is formed by joining three fan-shaped soft felts.

CN102748951A describes a thermally insulating material in the form of a unit formed from slats. The slats comprise tongues and grooves, which can be connected to form a circular arc-shaped thermal insulation cylinder. Constructing said unit from slats is intended to allow for local replacement and repair of damaged parts. The thermal insulation property is intended to be excellent and to last for the entire service life. The thermal insulation cylinder can be stored and transported conveniently. It is intended to be used to greatly reduce operating costs.

DE68920856 T2 describes a tubular heat insulator, consisting of (a) layers of carbon fibre felt wound in the shape of a spiral that contain carbonised resin, and (b) carbonised film and/or net and resin present between the felt layers that form a continuously laminated tubular element, wherein the felt layers are integrally bonded to one another by carbonised resin present between the felt layers. The thermal insulator is intended to have a high density and to provide excellent thermal insulation and surface smoothness. Its density is intended to be variable in the direction of the radius. The thermal insulator is also intended to be producible with a high level of productivity without carrying out a complicated method.

WO 2013/174898 A1 describes a thermal insulating body consisting of a material comprising carbonised fibres and/or graphitized fibres for lining a high-temperature furnace, wherein the thermal insulating body is composed of at least two individual parts, wherein at least two individual parts joined together each comprise at least one connecting element and the connecting elements of the at least two individual parts joined together interlockingly engage in one another to form an undercut.

In certain high-temperature treatment methods, a substrate to be treated, for example a fibre substrate in glass fibre production, is continuously guided through a high-temperature treatment zone. The temperature in the high-temperature treatment zone can be at least 800° C., for example.

The high-temperature treatment zone has to be continuously supplied with power in order to hold the temperature in the high-temperature treatment zone within a specific narrow high range. This is done by inductive high-temperature heating. In this case, electrical coils arranged around the high-temperature treatment zone inductively couple to at least one heating element. The heating element can be a high temperature-resistant wall surrounding the high-temperature treatment zone. The wall can contain graphite.

With certain insulation materials, excessive amounts of heat appeared to have been directly emitted by the furnaces during inductive high-temperature heating and therefore the environment thereof was strongly heated and additional measures had to be taken to dissipate excess heat, such as complex ventilation or cooling of the production hall in which the furnaces were operated.

SUMMARY

The object of the present invention consists in providing a thermal insulation material, which can be used for high temperature furnaces for producing glass fibres, for example, and by means of which it is possible to permanently and reliably inductively heat a high-temperature treatment zone at high temperatures while requiring reduced effort to dissipate waste heat.

This object is achieved by an insulation element for thermally insulating an inductively heatable high-temperature treatment zone, wherein a wall of the insulation element contains a flat material, the specific electrical resistance $\rho_F$ of which is $10^{-5}$ to $10^{-1}$ Ωm, surrounds a cavity extending through the insulation element and comprises a break in which the specific electrical resistance $\rho_U$ is greater than $\rho_F$, wherein the break extends from the outer surface of the flat material and into the flat material but does not create a break in the flat material across the entire flat material cross section.

Since the wall surrounds a cavity extending through the insulation element, the shape of the insulation element can be approximated by a hollow cylinder. The hollow cylinder comprises an inner lateral face, an outer lateral face and two end faces. The wall of the insulation element extends circumferentially in a region delimited by the inner lateral face and by the outer lateral face and extends from one end face to the other end face of the hollow cylinder. It goes without saying that the hollow cylinder merely is a geometric shape used to define the invention in this case.

It is not necessary for the insulation element to take up the entire volume of the hollow cylinder that is present between the lateral faces and is delimited by the end faces. For example, the insulation element can be a laminate composite of two hollow-cylindrical materials of different lengths, for example a longer internal CFC tube, wherein only part of the CFC tube is circumferentially coated with the flat material. Although the inner surface of the CFC tube may then approximately coincide with the inner lateral face of the hollow cylinder and the outer surface of the flat material may coincide with the outer later surface of the hollow cylinder, this insulation element nevertheless then does not take up the entire volume of the hollow cylinder since the flat material does not reach the end faces.

Of course, the insulation element can take up either all or approximately all of the entire volume of the hollow cylinder either, for example at least 90 vol. % or at least 95 vol. %, for example when the insulation element only consists of flat material that has the shape of a hollow cylinder.

The invention does not exclude the fact that, in addition to the flat material, the insulation element comprises additional high temperature-stable materials, which can be present in the composite, for example the laminate composite, together with the flat material. In typical insulation elements according to the invention, the flat material together with the breaks extending from the outer surface of the flat material and into the flat material takes up at least 20 vol. %, in general at least 35 vol. %, preferably at least 50 vol. %, particularly preferably at least 65 vol. %, for example at least 80 vol. % of the volume of the insulation element.

According to the invention, the wall of the insulation element comprises a flat material. Any flat material is suitable that withstands the high temperatures acting on the flat material resulting from the high temperature treatment and the specific electrical resistance of which is within the range according to the invention. It is well known that different high temperature-stable flat materials can each be used on an ongoing basis up to an upper temperature limit specific to the material. Accordingly, a person skilled in the art would choose the flat material on the basis of the high temperature application such that the material-specific upper temperature limit is preferably not reached and especially not exceeded.

The flat material can comprise carbon fibres and/or expanded graphite, for example. This means that the material can be used at high temperatures in an inert environment. As is known, expanded graphite can be produced by graphite being treated with specific acids, wherein a graphite salt forms having acid anions embedded between graphene layers. The graphite salt is then transformed into the expanded graphite by being exposed to high temperatures of 800° C., for example.

The flat material is preferably a carbon-containing flat material, for example a carbon fibre-containing flat material. The carbon fibre-containing flat material can be a carbon fibre-containing felt. Carbon fibre-containing means that the flat material, for example the felt, contains carbon fibres.

Any fibre whose carbon content is at least 60 wt. %, more preferably at least 80 wt. %, particularly preferably at least 92 wt. %, especially preferably at least 96 wt. %, very particularly preferably at least 99 wt. % and most preferably at least 99.5 wt. % is characterised as a carbon fibre in this case. The designation carbon fibre includes therefore carbonised and graphitized fibres here. These can by rayon-, panox- or peach-based carbon fibres. The surface thereof can be finished, for example with pyrolytic carbon (PyC) or silicon carbide.

The flat material, for example the felt, can contain additional components in addition to carbon fibres. All sufficiently high temperature-stable materials by means of which a sufficiently high thermal insulation effect can likewise be achieved, even at very high temperatures, are considered to be additional components. In particular, the flat material can contain ceramic fibres as additional components.

A particularly preferred flat material is a carbon fibre felt, for example a soft carbon fibre felt or a rigid carbon fibre felt. Fibres are connected in a rigid carbon fibre felt. The connection can be produced by means of carbonised residues, for example by residual carbonised phenol resin. The connection can also comprise the substances pyrolytic carbon and/or silicon carbide described above in connection with the carbon fibres. The felt thereby becomes rigid since fibres no longer move relative to one another at the points where they are connected. In a soft carbon fibre felt, the fibres are not connected in such a way. The soft carbon fibre felt can be strengthened by needling, for example.

The specific electrical resistance $\rho_F$ of the flat material is $10^{-5}$ to $10^{-1}$ Ωm. The specific electrical resistant of carbon-containing and in particular carbon fibre-containing flat materials that have proven successful in practical use as a high temperature thermal insulation material for a long time and have been addressed in more detail above, lies within this range.

Should a person skilled in the art be free to select high temperature-stable thermal insulation materials, he would not arrive at selecting a flat material having a specific electrical resistance in the range of from $10^{-5}$ to $10^{-1}$ Ωm. This is because simultaneous carried out in connection with this invention clearly indicate that flat materials having a specific electrical resistance in the range of $10^{-5}$ to $10^{-1}$ Ωm lean towards relatively strong, undesirable heating when interacting with the heating coil. However, on account of the extreme demands placed on temperature stability and thermal insulation effect, only a very narrow range of flat materials is actually available to choose from and the above-mentioned carbon-containing and in particular carbon fibre-containing flat materials have thus proven successful in practice, not least because they can be produced from relatively inexpensive starting materials using a reasonable amount of effort.

In these flat materials having average specific electrical resistances in the range of from $10^{-5}$ to $10^{-1}$ Ωm, this interaction between the heating coil and flat materials leads to relatively strong currents that thereby likewise flow over relatively high resistances. Therefore, flat materials having a specific electrical resistance in this range lean towards particularly strong, undesirable heating. In this case, the following factors tendentially reduce the specific electrical resistance of the flat material: 1) a high carbon fibre content of the flat material, and 2) a high content of graphitized carbon fibres in the flat material. Graphitized carbon fibres are carbon fibres obtained by pyrolysis at very high temperature of, for example, from 1600 to 3000° C., preferably from 1700 to 2400° C. Graphitized carbon fibres generally conduct electrical current better than carbon fibres that have not been graphitized. It goes without saying that the term carbon fibre is not intended to be limited to graphitized carbon fibres here. The carbon fibres contained in the flat material can be obtained by pyrolysis at relatively low temperatures of from 800 to 1600° C., in particular from 800 to 1200° C., for example.

According to the invention, the wall of the insulation element comprises a break, in which the specific electrical resistance $\rho_U$ is greater than $\rho_F$ The break extends from the outer surface of the flat material into the flat material.

However, it does not create a break in the flat material across the entire flat material cross section.

The fact that the break does not create a break in the flat material across the entire flat material cross section means that the flat material is continuous in a flat material region that is directly adjacent to the break. In order to move the two flat material regions that are adjacent to the break away from one another, the flat material must therefore be cut through.

In connection with the present invention, extensive simulations have been carried out to be able to describe the effect of breaks of the quantities of heat released to the outside in more detail. These surprisingly showed that the break extremely effectively counteracted strong and undesirable inductive heating of popular flat materials with minimum effort. The current generally flowing in the circumferential direction in the flat material encounters an obstacle that consists in the break. In this case, it is diverted around the obstacle into subjacent regions of the flat material, thereby increasing the resistance and a considerable amount of the heat generated in the flat material, for example felt containing carbon fibres, does not occur at the outer surface of the flat material.

In certain embodiments, the wall of the insulation element comprises just one break. In general, a plurality of breaks is preferable. The number of breaks can therefore equal at least 2, at least 3, at least 4, at least 6, at least 8, at least 10, at least 12, at least 16 or at least 20; preferably being at least 3, at least 4 or at least 6. This means that the detour for the flow of current is increased or the electrical resistance is increased. It goes without saying that the following features relating to the break are each only intended to apply to one break, to two or more breaks or to all the breaks.

The break can be a cut made in the flat material. The cut is by far the simplest way of making the desired break. The flat material is only cut into, and not through, in this case. This ensures that the flat material is not broken by the cut across the entire flat material cross section.

At least part of the break (particularly preferably the entire break) preferably does not extend orthogonally to the two next surface regions of the flat material. This means that the view factor for the thermal radiation between the hot surface and the cold environment is reduced. The proportion of the radiation that reaches the environment through the break is thereby minimised. This radiation in particular comes from the hot surface of the susceptor.

For the insulation element according to the invention, the shape of which can be approximated by a hollow cylinder, the length, shape and orientations of the break(s) at the outer surface of the flat material are preferably selected such that the following applies:

$$L_u > a \cdot L_t$$

whereby $L_t$ is the length of the shortest path around the flat material that extends along the outer surface of the flat material, across the break(s) and into a central sectional plane that divides the flat material into two halves of equal flat material volume orthogonally to the longitudinal axis of the hollow cylinder, $L_u$ is the length of the shortest path around the flat material that extends from break to break in the central sectional plane in each case but does not pass across the breaks (s), instead passing around the break(s), and a is 2, preferably 5.

This is shown in FIGS. 1C and 1D. This means that the electrical current induced cannot flow unimpeded in the circumferential direction but is redirected around breaks, thereby increasing the electrical resistance and reducing the power induced in the flat material.

It is generally preferable for the break to have a considerably higher specific electrical resistance than the flat material. $\rho_U$ is preferably at least $100 \cdot \rho_F$, in particular at least $1000 \cdot \rho_F$, for example at least $10000 \cdot \rho_F$. The specific electrical resistance of air is in the order of magnitude of $>\sim 10^{14}$ Ωm, whereby the exact value depends on the water content of the air, inter alia. If the break is a cut, $\rho_U$ is therefore several orders of magnitude higher than $\rho_F$.

However, the intended diversion of the electrical current, which is induced in the flat material, around the break is always reached when $\rho_U$ is considerably higher than $\rho_F$. A real insulator or a break in the form of a cut does not have to be provided to achieve the desired effects as per the invention. The required relationship of $\rho_U$ being at least $100 \cdot \rho_F$ can also be achieved without difficultly using other high temperature-stable materials that can potentially be used as the break, such as boron nitride, since $\rho_F$ is approximately $10^{-3}$ Ωm in a typical carbon fibre felt. The specific electrical resistance is measured in accordance with DIN 51911. This standard relates to measuring the resistance of graphite.

The flat material extends from a first edge of the flat material to a second edge of the flat material. The first edge of the flat material faces the first end face of the above-mentioned hollow cylinder used to define the invention or coincides with the first end face of this hollow cylinder. The second edge of the flat material faces the second end face of this hollow cylinder or coincides with the second end face of this hollow cylinder. It is preferable for the break to be at a spacing from at least one of the two edges and in particular from the two edges of the flat material. The break then does not create a break in the flat material in particular in a flat material region that extends from one end of the break up to one edge of the flat material. The break then preferably does not create a break in the flat material, in particular in two flat material regions, wherein one of these two flat material regions extends from one end of the break up to one of the edges and the other of these two flat material regions extends from a different end of the break up to the other edge. The flat material is therefore then continuous in a flat material region that extends from one end of the break up to one of the edges of the flat material or preferably in both flat material regions that each extend from a different end of the break to a different edge of the flat material. This means that the hollow-cylindrical insulation element or the flat material thereof is, on the one hand, more stable and, on the other hand, does not have to be constructed on-site from individual parts.

It is preferable when at least two breaks are inclined in the same direction with respect to the outer surface of the flat material. Breaks inclined in the same direction can have a greater depth and likewise only be at a very small spacing from one another. Should they be inclined in the same direction, one break would transition into the other break, which is generally not desirable. If the breaks are cuts that transition into one another, the parts of the flat material arranged between the cuts could easily break out. Breaks inclined in the same direction therefore allow for smaller spacings between breaks and therefore more efficient electrical decoupling of the flat material, for the most part without affecting the stability of the flat material. Ultimately this leads to stable insulation elements that are easy to handle and have a particularly low tendency towards undesirable heating of the flat material they contain.

It is particularly preferable for the break to lie entirely between two planes that extend in parallel and the spacing between which is at most 25%, in particular at most 15%, for example at most 10%, of the largest depth of the break. This means that the break extends in a substantially flat manner. A substantially planar cut can be made in the flat material in a particularly simple manner using a rotary blade (similar to in a circular saw but without teeth). The greatest depth of the break then corresponds to the greatest insertion depth of the blade, measured from the surface of the flat material in the direction of the cut. The inclination of the planes is not limited in this case. However, it is preferable for the inclination of the planes to be predetermined by the breaks in such a way that at least one of the two planes does not intersect the inner surface of the flat material or intersects said surface at an angle of no more than 45°.

It is preferably for the flat material to have a low degree of thermal conductivity. The flat material preferably has a degree of thermal conductivity of less than 10 $Wm^{-1}K^{-1}$. This is advantageous in that the dissipation of waste heat during the inductive high-temperature heating of a high-temperature treatment zone can then be reduced even further. If the flat material has a particularly low degree of thermal conductivity, less heat leaves the high-temperature treatment zone. The effort to dissipate waste heat from the hall where the high-temperature treatment process takes place is thereby also reduced.

The wall thickness of the flat material of the insulation element preferably varies in at least one sectional plane by no more than 10%. Sectional plane means any plane that is orthogonal to the axis of the hollow cylinder. This is advantageous in that undesirable heat losses uniformly occur in the radial direction at least in the region of this sectional plane. This has the advantage of even fewer production rejects.

The flat material can be a circumferentially continuous flat material containing carbon fibres, in particular a circumferentially continuous felt containing carbon fibres, for example a circumferentially continuous carbon fibre felt. A circumferentially continuous carbon fibre felt can be produced by a circumferentially continuous felt being produced from carbonisable fibres using known circular needling methods and the circumferentially continuous felt being transformed into a circumferentially continuous carbon fibre felt by high-temperature treatment in an oxygen-free atmosphere. This is advantageous in that the flat material does not comprise any seams or joints, and therefore no weak points are present at which material fatigue or delamination may occur during continuous use as a piece of high-temperature insulation.

Circumferentially continuous means that the arrangement of irregularly interconnected fibres that is characteristic of a felt that is created when felts are produced as a flat web of felt occurs circumferentially. When the circumferentially continuous felt containing carbon fibres is cut through orthogonally to the longitudinal axis of the insulation element, neither a beginning nor an end of the circumferential felt containing carbon fibres can be identified in the intersection. In particular, no joints and no seams are present in the sectional surface. The breaks according to the invention must then all be made in a downstream production step. This is advantageous in that only the breaks targetedly counteract heating of the flat material without having to take into consideration inherent inhomogeneities in the flat material, for example joints or seams, when making the breaks. As a result, heat is introduced into the high-temperature treatment zone in a particularly uniform manner. The proportion of the product that does not conform to specifications (reject) produced during the high-temperature treatment process is thereby reduced even further.

The flat material can also be formed from a set of flat material elements and at least one joint region that creates a break in the flat material across the entire flat material cross section can also be provided between the flat material elements. At least one of the flat material elements then comprises at least one break. It is preferably for at least two flat material elements to comprise a break. The hollow-cylindrical shape of the flat material elements is then formed by joining felt mats containing carbon fibres in the joint region or regions, for example.

The invention also relates to a set of insulation element portions for forming an insulation element comprising the insulation element portions, in particular for forming an insulation element that has been described above, wherein at least one of the insulation element portions comprises a flat material, the specific electrical resistance of which is $10^{-5}$ to $10^{-1}$ Ωm, and comprises a break in which the specific electrical resistance $\rho_U$ is greater than $\rho_F$, wherein the break extends from the outer surface of the flat material and into the flat material but does not create a break in the flat material across the entire flat material cross section.

An insulation element according to the invention can be composed on-site from the set of insulation element portions in a particularly simple manner. This is advantageous when there is insufficient space to transport an insulation element formed in one piece to its place of use or to install it at the place of use. When compiling the individual insulation element portions, an insulation element is formed, whereby joint regions that create a break in the flat material of the individual insulation element portions across the entire flat material cross section are produced by the compilation process. However, this is not a break like in the flat material itself, but a joint region whereby the resistance in the joint region does not substantially increase. Particularly if a spacing is not provided during joining.

In addition, the invention relates to a method for producing a flat material that can be used to insulate an inductively heated high-temperature treatment zone, wherein a flat material having a specific electrical resistance $\rho_F$ in the range of from $10^{-5}$ to $10^{-1}$ Ωm is cut from a main surface of the flat material into the flat material without cutting through the entire flat material.

Furthermore, the invention relates to the use of an insulation element according to the invention or to an insulation element formed from the set of insulation element portions according to the invention for thermally insulating an inductively heated high-temperature treatment zone, for example for thermally insulating an inductively heated high-temperature treatment zone in which glass fibres, or monocrystals that melt above 1000° C., are produced.

BRIEF DESCRIPTION OF THE FIGURES

The invention will be illustrated by the following drawings without being limited thereto.

DETAILED DESCRIPTION

Figure 1:
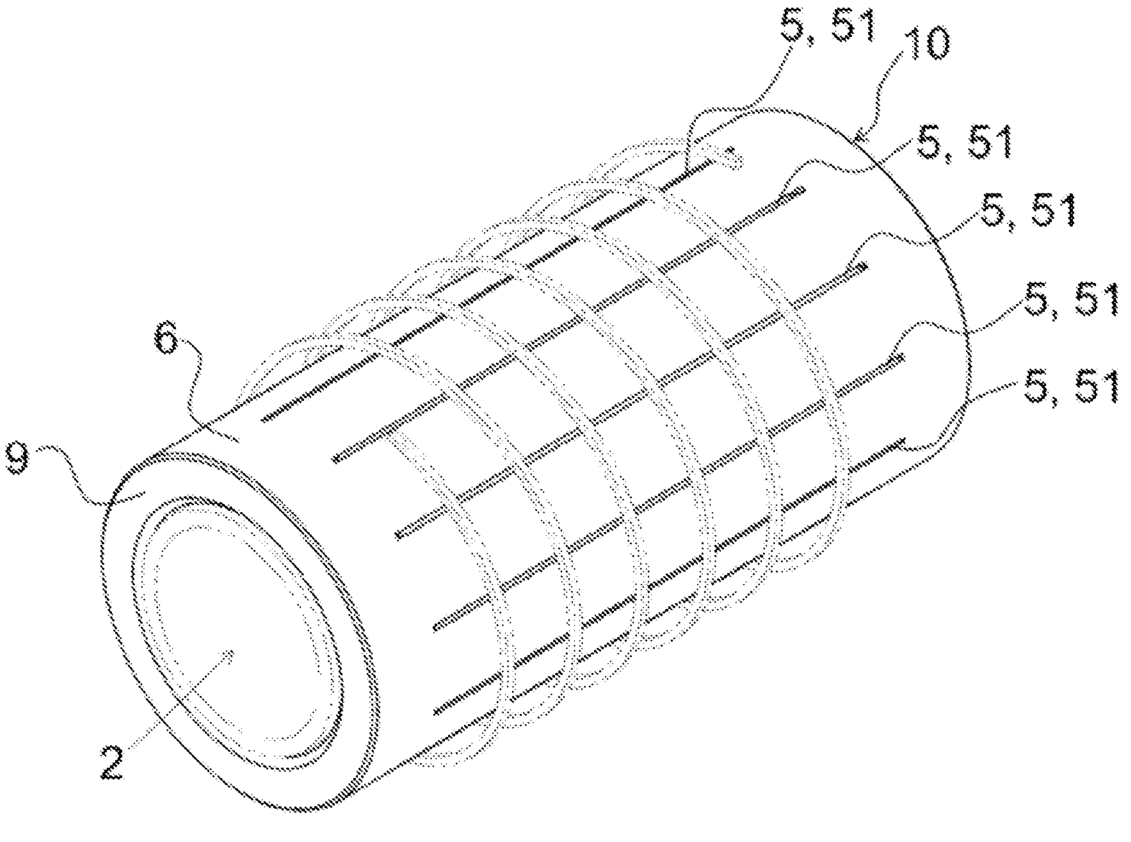
FIG. 1 is a perspective view of a first insulation element according to the invention, in which the coil and susceptor are indicated

The four different embodiments of the invention shown in the drawings are all insulation elements 1 for thermally insulating an inductively heatable high-temperature treatment zone 2. A perspective view indicating the coil and the outer surface 6 and susceptor and the inner surface is only shown for the first embodiment (FIG. 1). The other three embodiments can be used in exactly the same way that is indicated here for the first embodiment.

As is clearly visible in particular in FIGS. 1B, 2B, 3B and 4A, a wall of the insulation element 2 comprises a flat material 3 in all four embodiments. The wall is made from the flat material (soft carbon fibre felt having a degree of thermal conductivity of considerably less than 10 $Wm^{-1}K^{-1}$) in each case. The specific electrical resistance $\rho_F$ thereof is $10^{-5}$ to $10^{-1}$ Ωm. The soft carbon fibre felt surrounds the cavity 4 extending through the insulation element 1. These drawings also clearly show that the number of breaks 5 in each of the embodiments shown here equals 12. In none of the embodiments do the breaks extend orthogonally to the two surfaces 6 and 7 of the flat material 3 and are all inclined in the same direction. Each of the breaks are cuts. They are therefore electrically insulating.

Figure 1A:
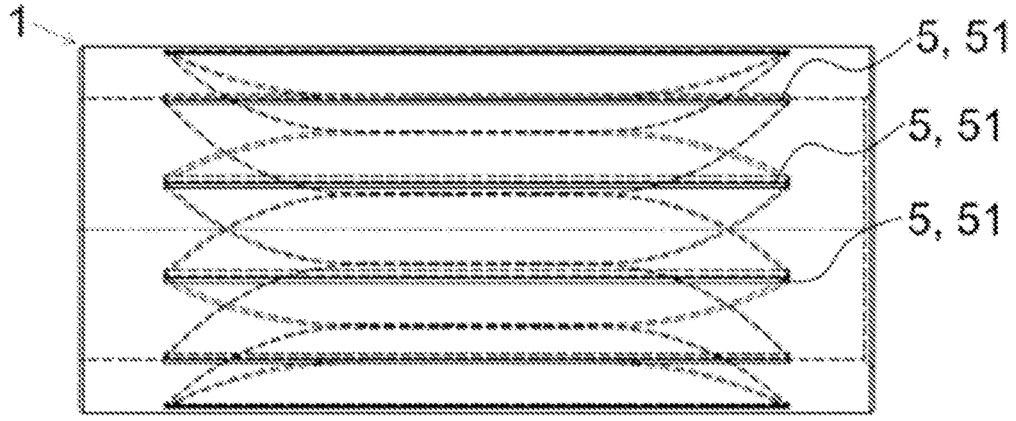
FIG. 1A shows the first insulation element according to the invention
Figure 1B:
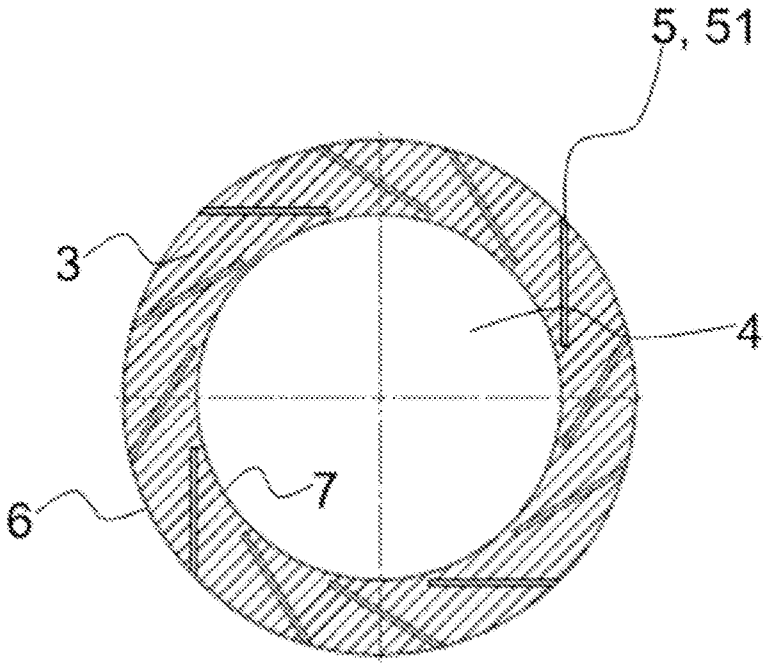
FIG. 1B is a section through the first insulation element according to the invention
Figure 1C:
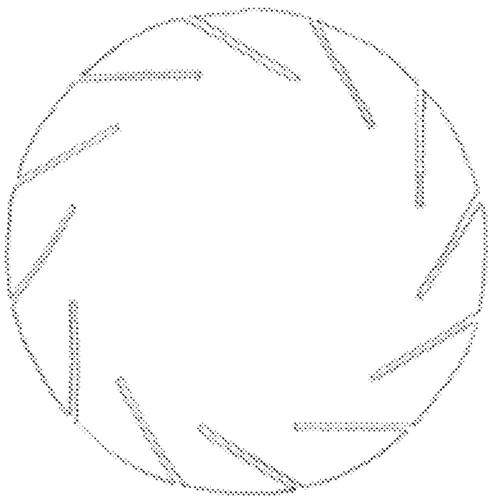
FIG. 1C shows the lengths of paths around the flat material of the first insulation element according to the invention
Figure 2A:
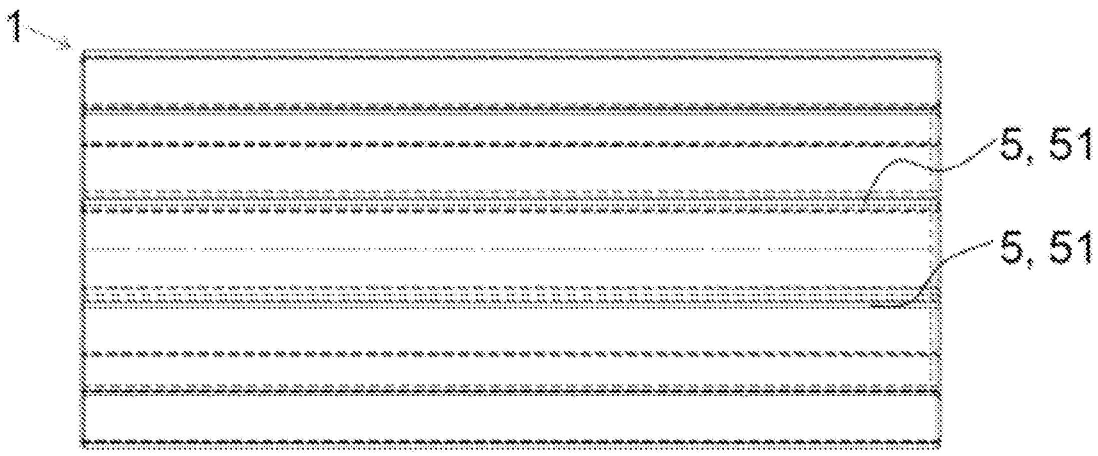
FIG. 2A shows the second insulation element according to the invention
Figure 2B:
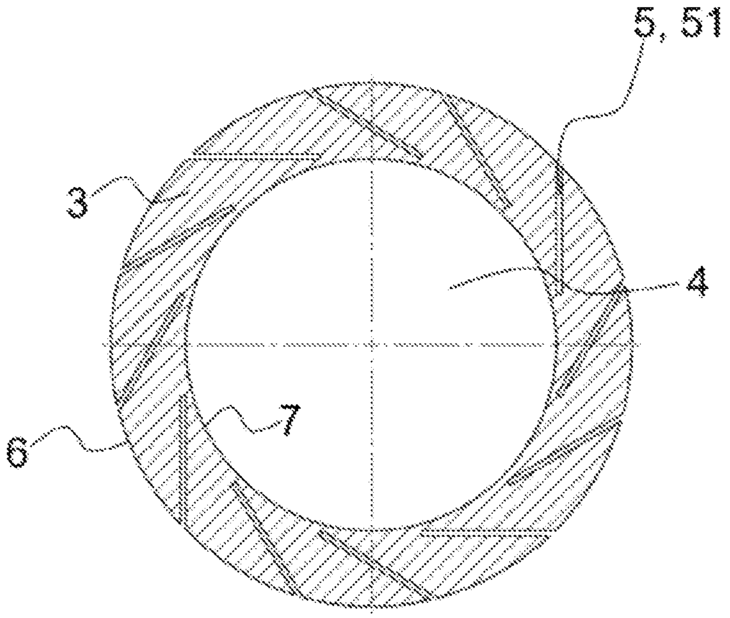
FIG. 2B is a section through the second insulation element according to the invention
Figure 3A:
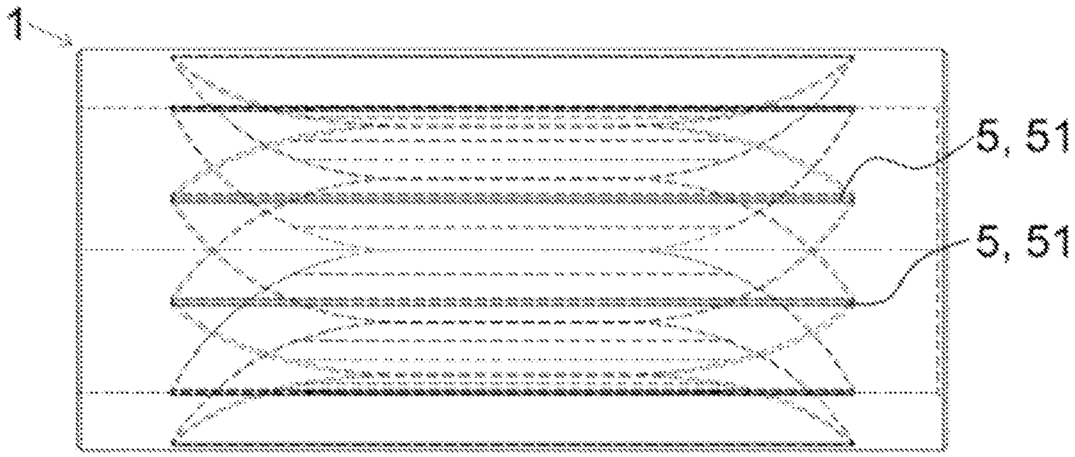
FIG. 3A shows the third insulation element according to the invention

In FIGS. 1A, 2A and 3A, regions of the breaks 5 covered by the flat material 3 are each shown by dashed lines. Likewise shown by dashed lines are the covered inner surfaces of the flat material. The specific electrical resistance $\rho_U$ of the breaks 5 is several times greater than the specific electrical resistance $\rho_F$ of the soft carbon fibre felt on account of the air located therein and the carbon fibres that are cut through. The breaks 5 extend from the outer surface 6 of the flat material 3 into the flat material 3 in all four embodiments.

It is clear from FIG. 1A that the breaks 5 do not create a break in the flat material 3 across the entire flat material cross section in the first embodiment. The cuts are not made as far as the two edges 9 and 10 indicated in FIG. 1. The breaks 5 are therefore at a spacing from the two edges 9 and 10 of the flat material 3 here. It is clear from FIG. 1B that the cuts are also not made as far as the inner surface 7 in the first embodiment either. The breaks 5 are therefore at a spacing from the inner surface 7 here, too.

FIG. 2A shows that the cuts intersect the two edges in the second embodiment. However, according to the invention, they still do not create a break in the flat material 3 across the entire flat material cross section. It is clear in FIG. 2B that the cuts are not made as far as the inner surface 7, alike in the first embodiment. The breaks 5 are at a spacing from the inner surface 7 here, too.

Figure 3B:
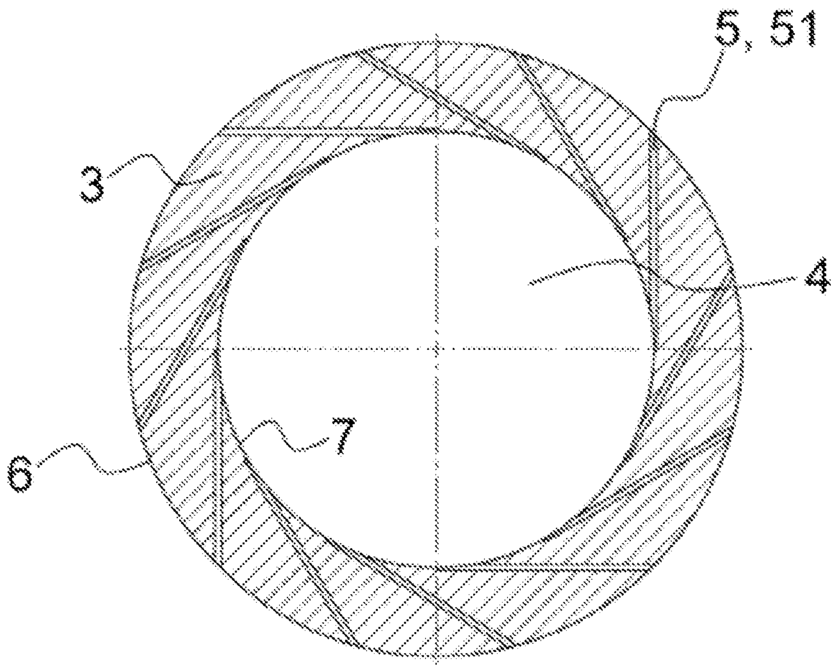
FIG. 3B is a section through the third insulation element according to the invention

In the third embodiment, the cuts are not made as far as the two edges (FIG. 3A). Therefore, they do not create a break in the flat material 3 across the entire flat material cross section. In contrast to the first and second embodiment, the cuts cut the inner surface 7 in the third embodiment (FIG. 3B).

In the first, second and third embodiment, the flat material 3 is therefore a circumferentially continuous flat material 3 containing carbon fibres.

Figure 1D:
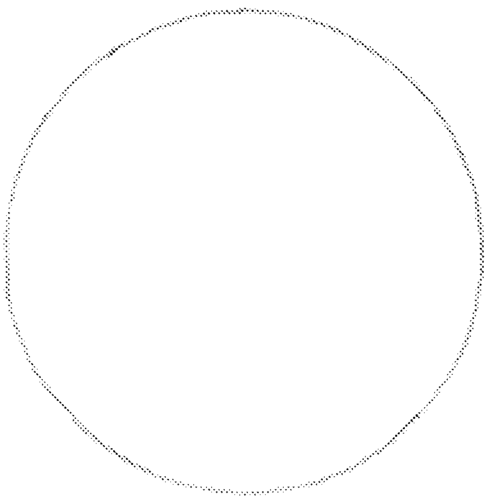
FIG. 1D shows the lengths of paths around the flat material of the first insulation element according to the invention

For the first embodiment, FIGS. 10 and 1D show that the length, shape and orientations of the breaks 5 at the outer surface of the flat material 3 are selected such that $L_U > a \cdot L_t$ applies when a equals 2. FIG. 10 shows $L_U$. $L_U$ is the length of the shortest path around the flat material 3 that extends from break 5 to break 5 in the central sectional plane in each case and does not pass across the breaks 5, instead passing around the breaks 5. The central sectional plate divides the flat material 3 into two halves of equal flat material volume orthogonally to the longitudinal axis of the hollow cylinder. $L_t$ is the length of the shortest path around the flat material 3 that extends along the outer surface of the flat material 3 across the breaks 5 in the central sectional plane that divides the flat material 3 into two halves of equal flat material volume orthogonally to the longitudinal axis of the hollow cylinder. It is evident that $L_U$ is approximately 3-times the size of $L_t$ in the embodiment shown here.

Figure 4A:
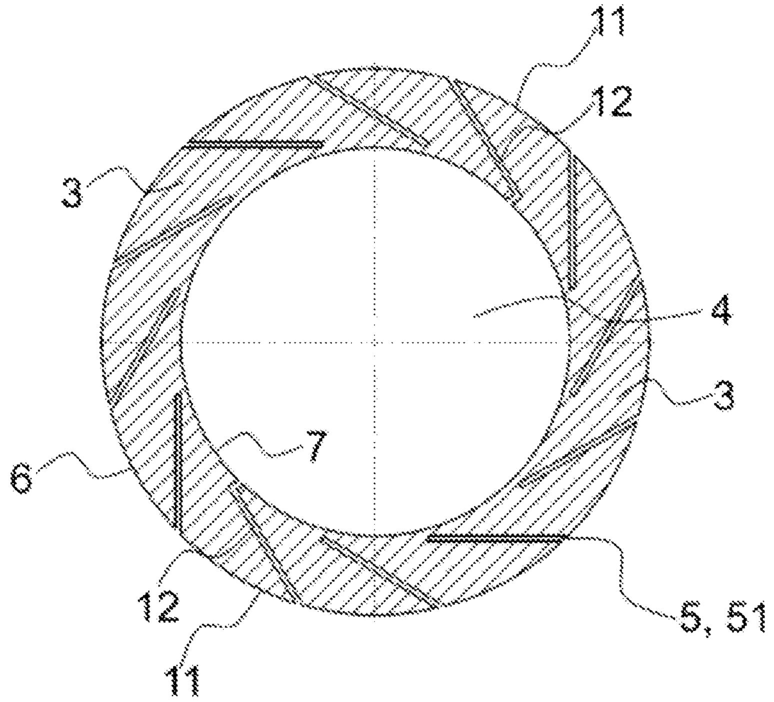
FIG. 4A is a section through a fourth insulation element according to the invention.
Figure 4B:
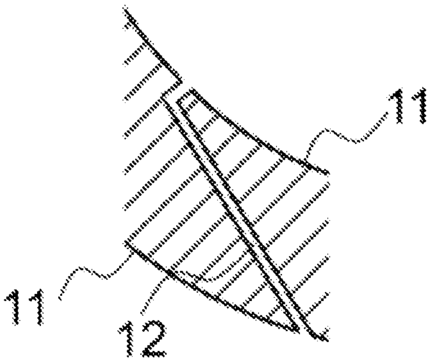
FIG. 4B is a cut-out from FIG. 4A.

In the fourth embodiment (FIGS. 4A and 4B), the flat material 3 is formed from a set of two flat material elements 11. In the embodiment shown here, two joint regions 12 are also provided between the flat material elements 11. Each joint region creates a break in the flat material 3 across the entire flat material cross section. The joint regions are therefore formed from edge to edge across the entire length of the insulation element and cut through it across the entire length from the outer surface 6 up to the inner surface 7. In contrast to the first, second and third embodiment, the flat material 3 in the fourth embodiment is therefore not a circumferentially continuous flat material 3 containing carbon fibres.

LIST OF REFERENCE NUMERALS

1 insulation element
2 high-temperature treatment zone
3 flat material
4 cavity
5 break
6 outer surface
7 inner surface
8 flat material cross section
9, 10 edges
11 flat material element
12 joint region

The invention claimed is:

1. An insulation element for thermally insulating an inductively heatable high-temperature treatment zone,
  - wherein a wall of the insulation element comprises a flat material having a specific electrical resistance ρF of $10^{-5}$ to $10^{-1}$ Ωm,
  - wherein the flat material surrounds a cavity extending through the insulation element and includes at least one break,
  - wherein the at least one break has a specific electrical resistance ρU≥100×ρF, and wherein each break extends from an outer surface of the flat material and into the flat material but does not create a break in the flat material across the entire flat material cross section.

2. The insulation element according to claim 1, wherein each break is a cut made in the flat material.

3. The insulation element according to claim 1, wherein at least part of each break does not extend orthogonally to the two surfaces of the flat material.

4. The insulation element according to claim 1, wherein the flat material has a degree of thermal conductivity of less than 10 $Wm^{-1}K^{-1}$.

5. The insulation element according to claim 4, wherein the flat material comprises carbon fibres and/or expanded graphite.

6. The insulation element according to claim 1, wherein the at least one break comprises at least 2 breaks.

7. The insulation element according to claim 1, the shape of the insulation element is approximated by a hollow cylinder, wherein the length, shape and orientations of each break at the outer surface of the flat material are selected such that the following applies:

$LU > a \cdot Lt$ whereby

Lt is a length of the shortest path around the flat material that extends along the outer surface of the flat material, across each break, and into a central sectional plane that divides the flat material into two halves of equal flat material volume orthogonally to a longitudinal axis of the hollow cylinder, Lu is a length of the shortest path around the flat material that extends from break to break in the central sectional plane in each case but does not pass across the respective break, instead passing around the respective break, and a is 2 or 5.

8. The insulation element according to claim 1, wherein each break is at a spacing from two edges of the flat material.

9. The insulation element according to claim 6, wherein at least two breaks are inclined in the same direction with respect to the outer surface of the flat material.

10. The insulation element according to claim 1, wherein the flat material is a circumferentially continuous flat material containing carbon fibres.

11. The insulation element according to claim 1, wherein the flat material is formed from a set of flat material elements and at least one joint region that breaks the flat material across the entire flat material cross section is additionally provided between the flat material elements.

12. A set of insulation element portions for forming an insulation element comprising the insulation element portions, wherein at least one of the insulation element portions comprises a flat material having a specific electrical resistance ρF of $10^{-5}$ to $10^{-1}$ Ωm, wherein the flat material comprises at least one break, wherein the at least one break has a specific electrical resistance ρU≥100×ρF, and wherein each break extends from an outer surface of the flat material and into the flat material but does not create a break in the flat material across the entire flat material cross section.

13. A method for producing a flat material that can be used to insulate an inductively heated high-temperature treatment zone, comprising:

providing a flat material having a specific electrical resistance ρF in a range of $10^{-5}$ to $10^{-1}$ Ωm, and forming at least one break in the flat material by cutting from a main surface of the flat material into the flat material without cutting through the entire flat material;

wherein the at least one break has a specific electrical resistance ρU≥100×ρF.

* * * * *